United States Patent Office 3,551,884
Patented Dec. 29, 1970

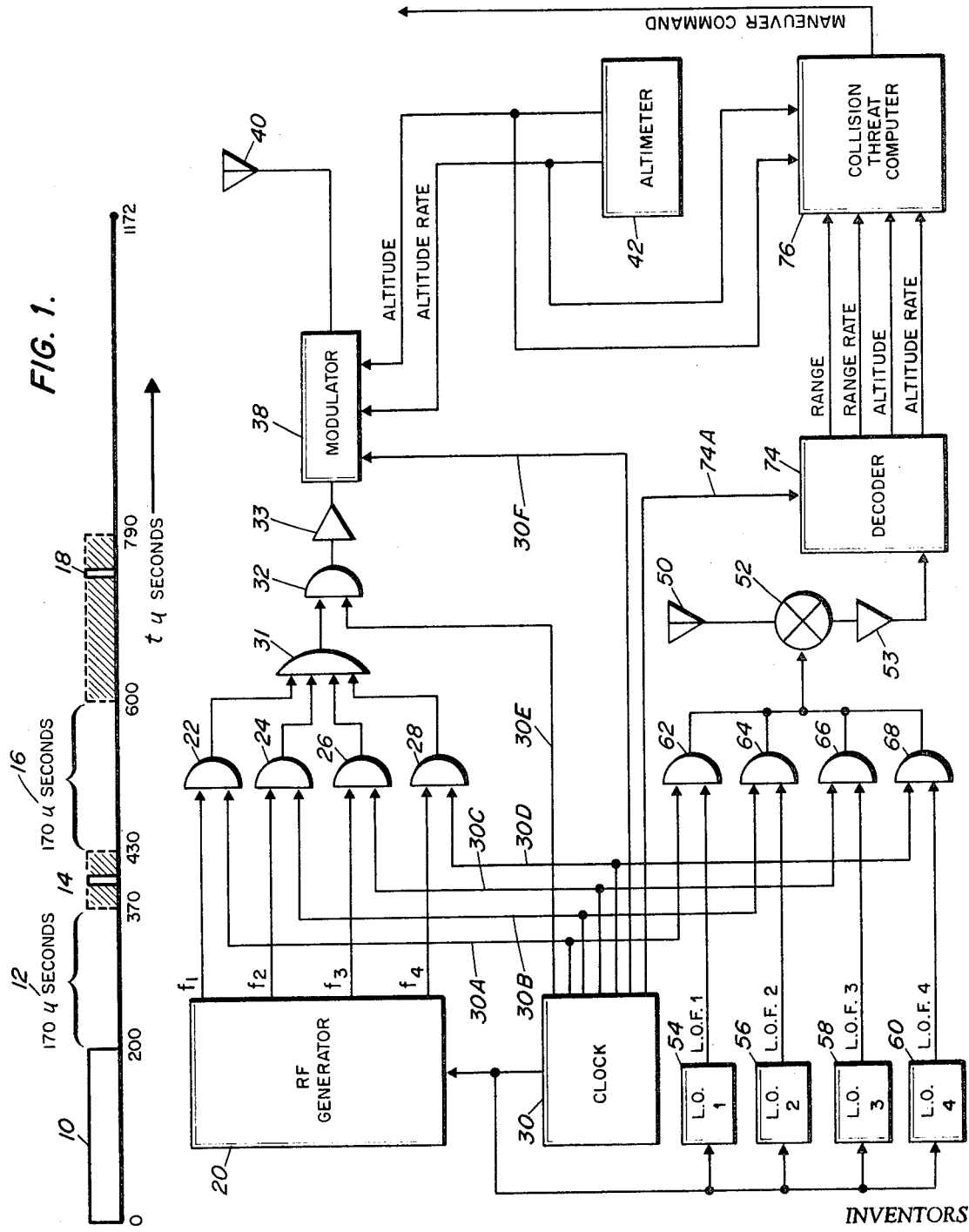

3,551,884
FREQUENCY DIVERSITY TIME MULTIPLEX MEANS FOR INCREASING CAPACITY OF A COOPERATIVE COLLISION AVOIDANCE SYSTEM
Wayne G. Shear, Pompano Beach, Fla., and Merlin E. Olmstead, Baltimore, Md., assignors to The Bendix Corporation, a corporation of Delaware
Filed Dec. 28, 1967, Ser. No. 694,239
Int. Cl. G01s 1/00
U.S. Cl. 340—23                              7 Claims

ABSTRACT OF THE DISCLOSURE

A frequency diversity time multiplex means for increasing the capacity of a cooperative collision avoidance system wherein the carrier frequency of transmissions in adjacent time slots is varied stepwise on a predetermined schedule.

BACKGROUND OF THE INVENTION

The problem of preventing mid-air collision of aircraft has long confronted the aviation industry generally. Recently this problem has become acute with the introduction of relatively large and expensive aircraft carrying large numbers of passengers in each aircraft. The public has come to expect that the commercial aviation industry provide a comprehensive flight schedule carrier out with a high degree of safety and the industry has striven to produce this. It is, however, now recognized that the capacity of the conventional air traffic control system (ATC) suffers from rather severe limitations because of the increasing volume of air travel. Under conventional ATC concepts each aircraft is assigned an exclusive volume of air space. As the density of traffic increases and air speeds increase, the volume of space which must be assigned to each aircraft becomes larger. With more aircraft in the air the available air space may become exhausted leaving as alternatives either a reduction in the assigned volume to each aircraft or a curtailment of flight services below that for which there is demand.

If the position of an airborne aircraft could be determined with greater accuracy with respect to other aircraft in its vicinity and the aircraft controlled with respect to this information, the effective available air space could be increased several fold. While it is conceivable that this can be accomplished with ground based equipment, the present indication is that the required accuracy and aircraft control cannot be achieved thereby. The practical solution to the problem, therefore, appears to be the equipping of each aircraft with suitable equipment to warn the pilot of a potentially dangerous situation with respect to nearby aircraft. The goal for many years has been to develop a self-contained collision avoidance system, wherein the equipped aircraft would be capable without any external aid to determine when a collision with another aircraft was a possibility and take the necessary steps to avoid the collision. The attractiveness of a self-contained system is primarily due to the concept that the equipped aircraft would be able to protect itself without having to rely on all aircraft in the sky being suitably equipped and hence, where safety was desired it could be purchased without the requirement that other aircraft be so equipped. A proposed self-contained, independently operating system comprised a computer which predicted an impending collision from bearing and range information obtained from an accurate short range radar. Attractive as the self-contained system is, the concept has proved to be impractical, in that an active radar with sufficient angular resolution to predict an impending collision from bearing constancy information is beyond the present state of the art because of serious limitations imposed by ground clutter, antenna size requirements, scanning losses, target blip scintillation, and available power output.

As an alternative, a cooperative collision avoidance system was proposed wherein each aircraft in the anticollision net was equipped with suitable equipment including an altimeter, an encoder, a computer, a transmitter and a receiver. An intruder aircraft in a given anticollision locality transmitted its altitude which was derived from the altimeter, at randomly selected time intervals to diminish the probability of interfering signals. All other aircraft in the anti-collision net received this information, both via a straightline transmission path and also via ground bounce. The time difference in reception of the straight line signal as opposed to the ground path signal when combined with the altitude of the receiving aircraft and the altitude of the transmitting aircraft allowed the receiving aircraft to derive the range of the transmitting aircraft. After a number of ranges had been computed by the receiving aircraft it could additionally compute a range rate. The ratio of range to closing range-rate, which is defined as the TAU function, is one criterion of collision threat. The effectiveness of TAU as a collision threat predictor is dependent upon how close TAU approximates the real time to closest approach (T) of the transmitting aircraft to the receiving aircraft. Analysis has shown, and it is well known in the art, that for large values of TAU at long ranges, TAU is a good approximation of T, being equal to T where the courses and speeds of the aircraft are such as to cause an actual collision. Also, when the relative velocity between the aircraft is large, TAU is a good approximation to T down to a predetermined alarm threshold value of TAU. However, when the aircraft are on slowly converging courses so that the closing range rate is small, TAU becomes quite large and cannot be considered in these circumstances as a valid threat criterion. A supplemental collision threat criterion based on minimum range must, therefore, be used. It will be remembered that both closing range rate and range are available so that a complete collision threat evaluation could be made. Two problems have shown this system to be impractical. First, since successive computation of ranges is required before a range rate can be computed, some comparatively long period of time must elapse from the time of first receipt of a collision avoidance message until the computer can make an evaluation of the collision threat. In practical equipment, approximately twenty seconds of data processing was required to compute range rate. The second problem is caused by the short time interval between the receipt of a direct signal and the bounce signal at low altitudes which can introduce a large uncertainty into the range calculation.

On of the more recently proposed collision avoidance systems which appears to have the best chance of providing a practical collision avoidance network also used the TAU and range criteria outlined above. This system utilizes a so-called master time technique wherein each cooperating aircraft is equipped with an accurate clock which is synchronized with all other airborne clocks in the anti-collision net and additionally may be synchronized with a master ground clock. A five second long epoch is divided into equally spaced time slots, each aircraft in the collision net being assigned a given time slot. Assuming all clocks in the net to be synchronized at the beginning of an epoch, all airborne systems simultaneously transmit a start signal at the beginning of the epoch. Thereafter, at its assigned time slot, an aircraft will transmit collision avoidance message containing information as to its altitude rate and altitude. The frequency on which this message is transmitted is controlled in a predetermined manner by the clock so that the transmitter frequency is known to all other aircraft; therefore, a Doppler shift in the received frequency at the receiving aircraft is a measure of the range rate of the transmitting aircraft with respect to the receiving aircraft. Additionally, since the time at which the transmitting aircraft commenced its transmission is known, the time of the message reception is a measure of the range between the transmitting aircraft and the receiving aircraft. It has been determined that typically an 800 microsecond period is required to transmit the collision avoidance system message. The present cooperative system is designed to warn of a collision threat at a range of sixty miles. However, when considering certain conditions of the antenna radiation pattern, transmittal power, receiver sensitivity, etc. the system will be likely to react to signals at 600 miles which is the line of sight limitation for two aircraft at 60,000 feet altitude. The probability of line of sight interference, therefore, becomes a very real problem which must be considered in the definition of a practical collision avoidance system, including cooperative systems based on the aforementioned standard time-frequency techniques. Normally a time slot would have to be sufficiently long to allow transmission of the collision avoidance system message, plus the transmit time of the message to a possible receiver. The 600 mile line of sight of transit time is approximately 3.7 milli-seconds. This time added to a data period of approximately 800 microseconds implies a slot period of 4.5 milliseconds if adjacent slot interference between aircraft having the aforementioned 600 mile line of sight limitation is to be precluded. Assuming an epoch period of five seconds, it is obvious that only 1100 such 4.5 millisecond slots can be accommodated on a single R.F. channel. Not only is this number of time slots clearly insufficient to accommodate future projected aircraft entities, it is now in danger of being overloaded in certain high density environments, even assuming stringent regional time slot management.

SUMMARY OF THE INVENTION

Accordingly, a frequency diversity time multiplex technique and means has been devised for providing an approximately four-fold increase in capacity in a given epoch time, wherein the slot period is determined by the data transmission period plus the maximum design range time rather than the data transmission period plus the maximum line of sight transmission time. Thus, assuming application of a message structure 800 microseconds in length and a sixty mile range through which it is desired to transmit this message, the slot need be only 800 microseconds for the message plus 382 microseconds for the sixty mile maximum design range, meaning a slot period of only 1.172 milliseconds is required. Adjacent slot line of sight interference is eliminated by stepping the frequency at the end of a useful slot period cyclically through four distinct frequencies, one for each of four consecutive time slots and then repeating the program for the next four consecutive time slots, etc. Thus the transmitter assigned slot one would transmit on frequency one and all receivers would receive on frequency one; the transmitter assigned slot two would transmit on frequency two and all receivers would receive on frequency two; transmitter three on frequency three and transmitter four on frequency four, following which the sequence would be repeated, that is, transmitter five would transmit on frequency one, transmitter six on frequency two, etc. This technique of eliminating adjacent slot interference by stepping the frequency at the end of the useful slot period allows a total of 4250 slots in a five second epoch. It will be noted that the time interval required to step through four consecutive time slots is 4.688 milliseconds or slightly in excess of the time required for a 600 mile line of sight transmission. Since, as has been mentioned, 600 miles is the line of sight limitation for two aircraft at 60,000 feet altitude the possibility of signal interference is eliminated for aircraft operating below this altitude and made highly improbable for aircraft operating over this altitude.

This system, while providing a four-fold increase in capacity in a given epoch time, requires very little increase in complexity. All that is required is that the receiver local oscillator be stepped in frequency in synchronization with the slot counts and similarly that the transmitters be able to transmit the same four frequencies, since the aircraft slot assignment will determine the carrier frequency of the transmission.

BRIEF DESCRIPTION OF THE DRAWING

FIG. 1 is a diagram of the structure of a collision avoidance system message based on the teachings of this invention.

FIG. 2 is a block diagram of an airborne station in accordance with this invention.

DESCRIPTION OF THE PREFERRED EMBODIMENT

Referring to FIG. 1 the collision avoidance system message which a cooperating aircraft transmits in its time slot is seen to consist of a 200 microsecond C.W. pulse 10 which is required for Doppler range rate determination. The leading edge of the 200 microsecond Doppler pulse, when compared with the master clock in the receiving aircraft, serves to determine the range to the transmitting aircraft from the receiving aircraft. A multipath guard time of 170 microseconds 12 is provided after the Doppler pulse to eliminate ground interference. The guard time includes 120 microseconds for a 60,000 foot altitude round trip, plus 50 microseconds ringing time. An altitude rate pulse 14, typically 2 to 4 microseconds long, is next transmitted, the leading edge of which, with respect to the leading edge of the Doppler pulse, communicates the altitude rate of the transmitting aircraft. An altitude rate pulse leading edge occurring less than 400 microseconds after the Doppler pulse leading edge indicates decreasing altitude, while a similar leading edge occurring more than 400 microseconds after the Doppler pulse indicates increasing altitude and a leading edge occurring 400 microseconds after the Doppler pulse leading edge indicates zero altitude rate. Additionally, the following altitude rate pulse position code is recommended:

| Altitude rate | Weighing factor, ft./min./μsec. | Pulse leading edge deviation from 400 microseconds, μsec. |
| --- | --- | --- |
| 0 to 2K ft./min | 250 | 0 to 8. |
| 2 to 5K ft./min | 500 | 9 to 14. |
| 5 to 20K ft./min | 1000 | 15 to 29. |

As an example of altitude rate determination, assume an altitude rate pulse is received 385 microseconds after a Doppler pulse leading edge. This is a —15 microsecond deviation from 400 microseconds slot time. The transmitting aircraft's altitude can thereby be calculated to be decreasing at a rate of 250 ft./min./μsec. for the first 8 microseconds of deviation or 2000 ft./min. plus 500 ft./min./μsec. for the next 9 to 14 microseconds of deviation or 3000 ft./min. additional plus 1000 ft./min./μsec. for the last microsecond deviation for a total of 6000 ft./min. A maximum altitude rate of 20,000 ft./min. is to be expected, thus the altitude rate pulse should occur within the time interval of 370 to 430 microseconds after the Doppler pulse leading edge.

Another multi-path guide time of 170 microseconds follows the altitude rate pulse and is followed in turn by an altitude pulse 18 also typically 2 to 4 microseconds long. The position of the altitude pulse leading edge with respect to the leading edge of the Doppler pulse indicates the altitude of the transmitting aircraft with zero altitude being indicated by a pulse commencing 600 microseconds after zero slot time. The following altitude code is recommended:

| Altitude | Weighing factor, ft./µsec. | Pulse leading edge deviation from 600 µsec. |
|---|---|---|
| 0 to 20K ft | 250 | 0 to 80 µsec. |
| 20K to 50K ft | 500 | 81 to 140 µsec. |
| 50K to 100K ft | 1000 | Over 140 µsec. |

Computing the transmitting aircraft's altitude in the same manner that altitude rate is computed, an altitude pulse having a leading edge at 750 microseconds slot time indicates an altitude of 20K ft. plus 30K ft. plus 10K ft. for a total of 60,000 feet. Aircraft altitudes under 100,000 feet are to be expected to occur between 600 and 790 microseconds after the Doppler pulse leading edge. The time slot continues for another 382 microseconds which corresponds to the transit time for slightly in excess of a sixty mile range. The slot period is thus seen to be 1172 microseconds, at the end of which the frequency is stepped to eliminate adjacent slot line of sight interference.

Although it has been shown that four frequencies is optimum for the message length and line of sight protection desired, a different message length or line of sight protection might dictate a different number of frequencies.

It should be remembered that an aircraft is assigned only a single time slot in a cyclical epoch which is approximately 5 seconds long, therefore, each aircraft transmits its collision avoidance message once every 5 seconds. However, since all factors determinitive of a collision threat are conveyed by the single collision avoidance message, the maximum time required to make a collision threat evaluation after an intruder aircraft comes within message range of a receiving (protected) aircraft is 5 seconds where the intruder comes within message range immediately after the termination of his assigned time slot.

Referring to FIG. 2, R.F. generator 20 which is suitably a frequency synthesizer and is a part of the transmitter section of a single local unit in a collision avoidance system generates four R.F. carrier frequencies, $f_1$, $f_2$, $f_3$ and $f_4$, which are suitable for use in a collision avoidance system network. The R.F. frequencies are applied respectively to gates 22, 24, 26 and 28. A clock 30 containing suitable counting circuits plus a controlling cesium atomic clock which has been synchronized with all other clocks in the collision avoidance system, supplies a reference frequency to R.F. generator 20 to precisely control its output frequencies and additionally generates gate enabling pulses sequentially on lines 30A, 30B, 30C, and 30D. Each gate enabling pulse has a period equal to the period of a single time slot. The outputs of gates 22, 24, 26 and 28 are applied to OR gate 31 with output from that gate applied to AND gate 32, which is enabled by a clock generated gate enabling pulse appearing on line 30E, the duration of this enabling pulse being the period of one time slot, the pulse commencing with the beginning of the time slot assigned to this particular unit. The carrier frequency passing through gate 32 is amplified in amplifier 33 and then applied to modulator 38. Simultaneously with the opening of gate 32, information is applied by the clock through line 30F to pulse position modulator 38 for the purpose of positioning the Doppler, altitude and altitude rate pulses with respect to slot zero time. The leading edge of the altitude pulse is set by altitude information received from altimeter 42, while the leading edge of the altitude rate pulse is set by altitude rate information received from the altimeter which is suitably a Doppler altimeter generating both altitude and altitude rate signals. The output of gate 32, which is the carrier frequency, is thus modulated and then transmitted over antenna 40.

The receiver section of the unit comprises local oscillators 54, 56, 58 and 60, whose outputs are applied respectively to AND gates 62, 64, 66 and 68. The receiver AND gates are energized by the same enabling pulses as energize the transmitter AND gates, gates 22 and 62 being energized simultaneously and in like manner gates 24 and 64, gates 26 and 66, and gates 28 and 68 are also energized simultaneously. Collision avoidance messages are received on antenna 50 and applied to mixer 52. Assuming that the message received is on frequency $f_1$, since all clocks in the system are synchronized, clock line 30A will be energized, opening gates 22 and 62. Local oscillator frequency 1 passes through gate 62 and is mixed with received radio frequency $f_1$ in mixer 52, the resultant intermediate frequency being amplified in I.F. amplifier 53 and then applied to decoder 74. Additionally, the leading edge of the received Doppler pulse is compared with the start of the time slot as determined by clock 30 and supplied to the decoder via line 74A to generate the range between the transmitting and receiving aircraft, while the leading edges of the altitude and altitude rate pulses are compared with the leading edge of the received Doppler pulse to generate the transmitting aircraft's altitude and altitude rate. Decoder 74 typically includes a crystal phase shift discriminator for determining the phase shift of the received Doppler pulse, and hence the range rate of the transmitting aircraft. Additionally, the decoder suitably includes three counters, the first of which is triggered into counting by own unit's start of time slot signal supplied from the clock over line 74A and is terminated by the leading edge of a received Doppler pulse, which received leading edge triggers the second and third counters into counting. The counts of the second and third counters are terminated by the receipt of the altitude rate and altitude pulses respectively. Weighing networks on the counter outputs generate voltage signals proportional to range, altitude rate and altitude, while the phase shift discriminator output is a voltage signal proportional to range from the receiving to transmitting aircraft.

Similarly, at the start of the next time slot line 30B is energized so that gates 24 and 64 are open. If a collision avoidance system unit is assigned to that time slot and is transmitting its message, the message will be received on antenna 50 and mixed with local oscillator frequency 2. The mixed products, as before, are applied to decoder 74 so as to generate the collision avoidance information with respect to the receiving aircraft and the aircraft then transmitting its collision avoidance message. The local oscillator frequencies are, of course, off-set with respect to one another by an amount sufficient to maintain intermediate frequency output of mixer 52 constant. The local oscillators are stabilized by a reference signal supplied by the clock.

The outputs of decoder 74, namely the intruder's range, range rate, altitude and altitude rate, are supplied to collision threat computer 76 which evaluates the information received and issues a maneuver command to the pilot should it find that a collision threat exists. As has been discussed, the collision threat can be evaluated by examining TAU and range. In order to prevent unnecessary maneuver commands and to decide what type of maneuver command should be issued if the collision threat does exist, the collision threat computer 76, after determining that the TAU or range criteria indicate that a collision threat exists, will compare the intruder's altitude and altitude rate with own aircraft altitude and altitude rate to further determine whether at the predicted time of closest approach the intruder will be within a predetermined vertical distance to own aircraft. If this additional criterion is also met so that the intruder will be within own aircraft's protected vertical distance at the time of closest aproach, the maneuver command will be issued. Three basic maneuver commands have been proposed:

(1) Climb/descend
(2) Hold altitude
(3) Level off
(4) Roll out (return to linear flight)

The actual operation and constructional details of the collision threat computer are not a part of the present invention, this computer being shown only to indicate the manner in which the derived range, range rate, altitude and altitude rate signals can be combined with own aircraft's altitude and altitude rate to determine the probability of collision and the evasive maneuver required to decrease that probability.

Although we have shown what we consider to be the preferred embodiment of our invention, certain alterations and modifications will become apparent to one skilled in the art. We do not wish to limit our invention to the specific form shown and accordingly hereby claim as our invention the subject matter including modifications and alterations thereof encompassed by the true scope and spirit of the appended claims.

What is claimed is:

1. A collision avoidance system for transmitting and receiving collision avoidance messages between individual units of said system wherein each said unit transmits a collision avoidance message on one radio frequency during a unique time slot assigned to said unit in a system epoch, said one frequency being assigned to said time slot and wherein each said unit receives all transmitted system messages, each said unit including a clock for counting and timing said time slots and generating signals in accordance therewith, means for synchronizing said clock with all other system clocks, and a transmitter comprising:
    a frequency source responsive to said clock signals for generating a plurality of distinct radio frequencies including said unit's assigned time slot's assigned radio frequency; and
    transmitter gating means responsive to said clock signals for selecting said unit's assigned radio frequency during said unit's assigned time slot; said plurality of radio frequencies being consecutively and cyclically assigned to said time slots so that adjacent time slots are assigned different frequencies.

2. An aircraft collision avoidance system as recited in claim 1 wherein each said unit includes additionally:
    means for generating a signal correlative to own aircraft's altitude, and altitude rate; and
    means responsive to said altitude and altitude rate signals and said clock signals for modulating said unit's assigned and selected radio frequency whereby said unit's collision avoidance message includes said unit's altitude and altitude rate information.

3. A collision avoidance system as recited in claim 1 with additionally a receiver comprising:
    local oscillator means responsive to said clock signals for generating a plurality of local oscillator frequencies, each said local oscillator frequency corresponding to one of said distinct radio frequencies, one mixed frequency product of any local oscillator frequency with its corresponding radio frequency being equal to said unit's intermediate frequency;
    receiver gating means responsive to said clock pulses for selecting a predetermined one of said local oscillator frequencies during each time slot;
    antenna means for receiving said system transmitted messages;
    mixer means connected to said antenna means and said receiver gating means for generating the mixed frequency products of said selected local oscillator frequency and received message frequency; and
    means connected to said mixer means for extracting collision avoidance information from said mixed frequency products.

4. A collision avoidance system as recited in claim 3 wherein said transmitter frequency source generates four distinct radio frequencies and said local oscillator means generates four corresponding local oscillator frequencies, each of said four distinct radio frequencies being cyclically assigned to consecutive time slots.

5. A collision avoidance system as recited in claim 3 wherein said transmitter gating means comprises:
    a plurality of first gates responsive to said clock signals, one for passing each said generated radio frequency during said radio frequency's assigned time slot;
    a second gate responsive to said clock signals and having as an input the radio frequency passed by said first gates for selecting said unit's assigned radio frequency during said unit's assigned time slot; and wherein said collision avoidance information extracting means includes a Doppler decoder for extracting Doppler information from a received collision avoidance message for generating the range rate of the unit transmitting said received collision avoidance message with respect to the unit receiving said message.

6. An aircraft collision avoidance system as recited in claim 5 wherein each said unit additionally includes:
    means for generating a signal correlative to own unit's altitude;
    means for generating a signal correlative to own unit's altitude rate;
    means responsive to said clock signal and said altitude and altitude rate signals for modulating said assigned and selected radio frequency in a predetermined manner with a Doppler pulse, an altitude pulse and an altitude rate pulse; and
    decoder means for extracting range and range rate information from a received Doppler pulse, altitude information from said altitude pulse and altitude rate information from said altitude rate pulse.

7. A collision avoidance system as recited in claim 6 wherein a transmitting unit transmits said Doppler pulse at the beginning of its assigned time slot and pulse position modulates said altitude and altitude rate pulses with respect to the leading edge of said Doppler pulse, said Doppler, altitude and altitude rate pulses comprising said transmitting unit's collision avoidance message, and wherein said decoder means additionally includes:
    means for measuring the time from the start of a time slot to the receipt of the Doppler pulse of a received collision avoidance message for determining the range of the unit transmitting said collision avoidance message;
    means for measuring the time from the leading edge of said received Doppler pulse to the leading edge of the altitude rate pulse of said message for determining the altitude rate of said unit transmitting said message;
    means for measuring the time from the leading edge of said received Doppler pulse to the leading edge of the altitude pulse of said message for determining the altitude of said unit transmitting said message; and
    means for determining the frequency shift of a received Doppler pulse with respect to the assigned frequency for the occurring time slot for determining the range rate of said unit transmitting said message.

References Cited

UNITED STATES PATENTS

| | | | |
|---|---|---|---|
| 2,705,795 | 4/1955 | Fisk et al. | 325—56 |
| 3,020,399 | 2/1962 | Hollis | 325—56 |
| 3,262,111 | 7/1966 | Graham | 340—23 |
| 3,341,812 | 9/1967 | Perkinson et al. | 340—23 |

DONALD J. YUSKO, Primary Examiner

H. S. COHEN, Assistant Examiner

U.S. Cl. X.R.

325—40, 56